United States Patent [19]

Enoki et al.

[11] Patent Number: 4,472,336

[45] Date of Patent: Sep. 18, 1984

[54] METHOD OF MANUFACTURING VIDEO DISC

[75] Inventors: Yoshio Enoki, Katano; Kazuhisa Morimoto, Settsu, both of Japan

[73] Assignee: Matsushita Electric Industrial Co., Ltd., Osaka, Japan

[21] Appl. No.: 369,107

[22] Filed: Apr. 16, 1982

[30] Foreign Application Priority Data

| Apr. 17, 1981 [JP] | Japan | 56-58961 |
| Apr. 20, 1981 [JP] | Japan | 56-60217 |
| Aug. 20, 1981 [JP] | Japan | 56-131181 |
| Sep. 17, 1981 [JP] | Japan | 56-147675 |
| Dec. 17, 1981 [JP] | Japan | 56-203927 |

[51] Int. Cl.$^3$ ............................................. B29D 17/00
[52] U.S. Cl. ................................... 264/106; 264/105; 264/107
[58] Field of Search ...................... 264/105, 106, 107; 252/511

[56] References Cited

U.S. PATENT DOCUMENTS

| 3,842,194 | 10/1974 | Clemens | 178/6.6 A |
| 4,151,132 | 4/1979 | Khanna | 252/511 |
| 4,228,050 | 10/1980 | Martin et al. | 274/41 A |
| 4,275,100 | 6/1981 | Datta | 264/107 |
| 4,280,941 | 7/1981 | Datta et al. | 252/511 |
| 4,351,747 | 9/1982 | Miyamoto et al. | 252/511 |

*Primary Examiner*—James H. Derrington
*Attorney, Agent, or Firm*—Wenderoth, Lind & Ponack

[57] ABSTRACT

A method of manufacturing capacitance video discs comprising thermoplastic resins and conductive carbon black, wherein said conductive carbon black having an average primary particle size of 25 millimicrons or less is washed by water or an inorganic acid, heated at temperatures of 400° to 1,200° C. in a non-oxidizing atmosphere and wherein the coarse particles having a grain size of 0.05 mm or more are substantially eliminated. This method can provide video discs having reduced surface defects and stability after a moisture-proof test.

10 Claims, No Drawings

METHOD OF MANUFACTURING VIDEO DISC

FIELD OF THE INVENTION

The present invention relates to a method of manufacturing capacitance video discs characterized by a process of purifying conductive carbon black, which is one of the main components of capacitance video discs.

BACKGROUND OF THE INVENTION

As disclosed by Clemens in U.S. Pat. No. 3,842,194, the first capacitance video disc system was a plastic disc with geometric variations corresponding to information of which the surface was coated with a thin metal layer and a thin dielectric layer.

After that, as disclosed in Japanese Patent Laid-Open No. 116,104/1978, Fox et al. attempted to produce video discs from polymers containing conductive particles such as conductive carbon black therein.

Khanna, as disclosed in U.S. Pat. No. 4,151,132, improved the conductive polymer compounds.

Martin et al., as disclosed in U.S. Pat. No. 4,228,050 improved the thermal stability of the above described conductive polymer compounds.

Martin et al., as taught in Japanese Patent Laid-Open No. 158,919/1980, tried to reduce the surface defects of video discs, to stabilize the playback performance and to keep the stamper long by pulverizing conductive carbon black agglomerates to the size of 0.44 mm or less.

Huck et al., as disclosed in Japanese Patent Laid-Open No. 83,854/1981, and Datta et al., as disclosed in U.S. Pat. No. 4,275,100, improved the moisture-proofness of capacitance video discs by rinsing the discs made of conductive polymer compounds with an aqueous solution to remove the water-soluble salts and oxygen-containing impurities from the surface of the video discs.

SUMMARY OF THE INVENTION

It is an object of the present invention to provide video discs having reduced surface defects and improved moisture proofness. It is a further object of the present invention to provide an excellent video disc having a higher S/N ratio of a playback image. These objects are accomplished by the use of a conductive polymer compound comprising a thermoplastic resin and a conductive carbon black, said black being preliminarily purified by washing with water or an inorganic acid to remove ash therefrom in the process of moulding the video discs. In addition, these objects are further accomplished by the use of the purified conductive carbon black, said black being treated by heating at a temperature of 400° C. or more in a non-oxidizing atmosphere, by removing the coarse particles having a grain size of 0.05 mm or more by the dry classifying or by selecting the black having a primary particle size of 25 milli-microns or less.

DETAILED DESCRIPTION OF THE INVENTION

Capacitance video discs are produced from conductive polymer compounds, which consist of thermoplastic resins, such as polyvinylchloride (PVC), stabilizers such as organo tin compounds, lubricants such as fatty acid esters, other required additives such as plasticizers and processing aids, and conductive carbon blacks (conductive blacks). These materials are mixed at first by means of a pre-blender such as a Henschel mixer, and then mixed under heat and pressure by means of a two-roll mill or a twin screw extruder to obtain a homogeneous composition followed by pelletizing to form pellets.

Then the resulting pellets are kneaded under heat again followed by pressing by a stamper provided with rows of grooves and pits cut spirally or concentrically in correspondence to information signals on a metal flat plate to obtain video disc replicas. Grains of foreign matters and poor-dispersive carbon black agglomerates contained in the conductive black lead to the generation of surface defects, to drop-out or a missing track of signals or to the destruction of the stamper because said grooves and pits are very small in size, ranging from 0.5 to 5 microns.

According to the present invention, the use of purified conductive blacks from which said foreign matters and carbon black agglomerates were removed, can obtain the above described video discs having reduced surface defects and remarkably improved moisture-proofness. "Surface defects" designates the initial defects owing to the above described foreign matters and carbon black agglomerates. In addition, the term "moisture-proofness" designates a phenomenon of generating a new deformation, such as fine projections, on the surface of discs when the video discs are placed in a high temperature of 40° C. and high humidity atmosphere of relative humidity of 80% for 240 hours. Although the causes of this phenomenon have not been completely made clear at present, it can very well be that one of the causes of this phenomenon is the swelling of water soluble ash agglomerates nearby the surface of discs. Also the existence of "surface compounds" containing oxygen elements on the surface of the conductive black can be given as another reason of this phenomenon. These surface compounds will be direct or indirect causes leading to the above described phenomenon because they have a large affinity to water vapour.

In general, conductive black contains ash of about 0.3 to 3% by weight. The ingredients of ash are metal oxides, chlorides, sulfates, carbonates, silicates and the like. Although this ash is originated from various causes such as raw materials, reactors, additives, cooling water, pelletizing agents and the like, the ingredients dissolved in said cooling water will give the highest proportion of ash. Almost of the salts in conductive black is soluble in water, in particular hot water. Accordingly, 80% or more of ash in some sort of conductive black can be removed by repeating the process, which consists of dispersing the conductive black in water, then stirring and filtering it several times. Deionized water or distilled water is preferably used for washing.

The use of conductive black purified by this washing can obtain video discs having reduced initial surface defects.

In addition, even 95% or more of ash can be removed by washing some sort of conductive black with inorganic acids, such as sulfuric acid and hydrochloric acid in the same manner as washing with water. Although said inorganic acids include hydrochloric acid, sulfuric acid, nitric acid, phosphoric acid, hydrofluoric acid and the like; hydrochloric acid and sulfuric acid are recommended from both the viewpoint of their effect and cost. Inorganic acids having concentrations of 0.01 to 1N are preferably used. Temperatures of 70° C. or more are recommended for inorganic acids. It is necessary to sufficiently wash the conductive black with water, so that acids do not remain in the conductive black after washing with the inorganic acid. Further, a neutralization step with ammonia, after the washing with inorganic acid, is effective for increasing the washing efficiency.

It is frequently observed that conductive black shows a decrease in pH value measured according to ASTM D1512 after drying the washed conductive black at temperature of 100° C. or more in air. This phenomenon is dependent upon the properties and conditions of the conductive black, and in particular is remarkably shown in a conductive black having a large surface area and a large surface activity. It can be guessed also from the increase of volatile matter that the cause of the above-described phenomenon is the bonding of an oxygen element to the surface of the conductive black.

When conductive black is blended with a polyvinylchloride type thermoplastic resin in a twin screw extruder and the like under heating and then molded by a press, a conductive black of higher acidity accelerates the thermal decomposition of resins, leading not only to a deterioration of the resins themselves, but also to the corrosion of the blender, the stamper, and the like, owing to the hydrogen chloride gas generated.

When the washed conductive black is dried in nitrogen gas or a reduced atmosphere, a sharp fall in PH value is not observed. Also a method, in which conductive black is previously impregnated with a dilute aqueous solution of alkaline compounds such as ammonia, sodium carbonate, sodium hydroxide and the like, can be adopted for conductive black which becomes acidic in its drying process. In this case, an alkaline solution should be added in a minimum required quantity and a concentration of 0.001 to 0.1% is recommended.

Conductive black contains volatiles of about 1 to 3% after washing and drying. These volatiles contain surface oxygen compounds formed in the manufacturing process and the washing-drying process of conductive black. Carboxyl, carbonyl, hydroxy, quinon radicals and the like are known as said surface oxygen compounds. These compounds are decomposed by heating, at first releasing carbon dioxide at about 300° C. and then carbon monoxide. The pH value of conductive black increases with the elimination of surface oxygen compounds from the surface of black particles. It is, however, necessary to heat the carbon black at a higher temperature of 950° C. or more in order to completely remove said volatiles. Although the use of carbon black, from which said volatiles were completely removed by a high-temperature treatment, can obtain the above described discs having improved moisture-proofness, the dispersibility of conductive black into resins is lowered and thereby carbon black agglomerates are apt to remain, which lead to an increase of said primary surface defects resulting from said carbon black agglomerates.

According to the present invention, the primary surface defects and the moisture proofness of video discs can be further improved by heat treating the conductive black, which was washed and dried in the above described manner, at temperature of 400° to 900° C., preferably at temperature of 500° to 700° C., in a non-oxidizing atmosphere such as nitrogen gas, a vacuum and the like. These improvements result from the elimination of only surface compounds, which are decomposed at comparatively lower temperatures, to raise the pH of the carbon black. This can not only improve the above described moisutre-proofness, but also can maintain the conductive black dispersed in the resins by the action of surface compounds which are decomposed at comparatively higher temperature. In this case, heat treatment at 400° C. or less leads to an under-decomposition of said surface compounds, while heat treatment at 900° C. or more leads to an over-decomposition of said surface compounds, and thereby the appointed objects can not be sufficiently attained. It was, however, found that the addition of a process, in which the insoluble ash particles and poor-dispersive carbon black agglomerates are removed by a dry classification process of the conductive black, which has been washed, dried and heat treated in the above described manner, can expand the above described temperature range of heat treatment up to about 1,200° C. In determining the temperature range of the heat treatment, 3 defects or less/one side of a disc, are selected as a suitable average total number of surface defects, which is larger than 50 microns in diameter after the above described moisture-proofness test.

Classifiers, which can be used in the present invention, include a sieve classifier, an air flow classifier and the like. Coarse particles having a diameter of 0.05 mm or more is removed by a classification process. Because it was found from the detail observation of the surface defects appearing on the surface of video discs, the surface defects owing to particles having a diameter of 0.05 mm or more impart a remarkably bad influence upon the dropout and the missing track of a stylus for detecting signals. By a sieve classifier, coarse particles not passing the appointed sieve can be completely removed. While an air flow classifier classifies particles on the basis of their travelling distances owing to the difference of the mass of particle (as to the pelletized blacks, after crushing) dispersed in a swivelling air flow, this method can classify carbon blacks having smaller average grain sizes. In case of an air flow classifier, the particle size distribution conforms to a normal distribution in general. Accordingly, although it is difficult to avoid the presence of a remarkably small amount of particles having a diameter of 0.05 mm or more, it is possible to limit their content to 0.1% or less, which means they are substantially removed.

The selection of conductive black, which is classified in conductive furnace black, used in the present invention in their quality will now be described. It is desired that conductive polymer compounds used for capacitance video discs show an appropriate flow (for example $1 \times 10^{-2}$ cc/sec or more measured by means of Koka-type flow tester manufactured by Shimazu Seisakusho, Ltd., a nozzle of $1\phi \times 10$ mm, at a load of 50 kg/cm$^2$ at 180° C.). It is necessary also that discs molded have a sufficiently lower resistivity (most preferably a dc resistivity of 25 ohm-cm or less).

The determination of the quality of conductive black is carried out on the basis of the playback performance of video discs produced from conductive polymer compounds having a flow and resistivity in the appointed ranges.

It is found from the tests, according to this method, that only carbon black showing an oil absorption of 200 cm$^3$/100 g or more measured by ASTM D2414-79 of conductive blacks belonging to conductive furnace blacks can be simultaneously satisfied with respect to both flow and resistivity. As to conductive blacks, which are satisfied simultaneously under both conditions, ones having a primary particle size of 25 millimicrons or less, preferably 20 milli-microns or less measured by an electron microscope, are preferable because video discs showing excellent S/N ratios can be obtained from them. In addition, these S/N ratios are not remarkably influenced by the washing, heat treatment and the like of the conductive blacks.

The thermoplastic resins used in the present invention include polyvinylchlorides, vinylchloride-vinylacetate copolymers, vinylchloride-ethylene copolymers, vinylchloride-propylene copolymers, vinylchloride-(metha) acrylic alkylester copolymers, acrylonitrile-styrene copolymers, acrylonitrile-styrene-butadiene copolymers, acrylonitrile-styrene-ethylene copolymers, polymethylmethacrylate, methyl-methacrylatebutadiene copolymers and the like. In addition, it goes without saying that stabilizers, plasticizers, lubricants and the like may be added to these thermoplastic resins if necessary.

The quantity of conductive blacks added in said thermoplastic resins in the present invention should be such that a sufficient conductivity for making it possible to detest the capacitance of video discs. The standard dc resistivity of discs molded is 1,000 ohm-cm or less, preferably 100 ohm-cm or less, and most preferably 25 ohm-cm or less. Conductive blacks, which satisfy these conditions, should be added at ratios of 10 to 40 parts preferably 15 to 35 parts by weight based on 100 parts by weight of the resins used to construct the discs. Conductive blacks added at ratios of 10 parts by weight or less can not sufficiently increase the conductivity of the discs, while conductive blacks added at ratios of 40 parts by weight reduce the flow of the blends and increases the brittleness of the discs produced.

EXAMPLE 1

200 g of conductive black Ketjen EC (manufactured by Nippon EC Co., Ltd.) having a primary particle size of 30 millimicrons measured by an electron microscope, a specific surface area of 950 m$^2$/g measured by nitrogen adsorption method, a oil absorption of 350 cm$^3$/100 g measured by ASTM D2414-79, a pH of 9.0 measured by ASTM D1512-75 and an ash content of 0.50% measured by ASTM D-1506-79 were dispersed in 2.5 liters of pure water of room temperature, stirred for one hour, filtered by suction and washed with 10 liters of pure water. The washed conductive black was dried at 120° C. for 15 hours in air. The ash content of the washed black reduced to 0.29%, and the larger parts of such elements as Na, K, Ca, V are removed. The PH value of the carbon conductive black lowered to 7.0 after washing and drying. Then the mixture of the following composition was sufficiently blended by means of Henschel mixer:

The above described purified conductive black: 20 parts by weight
Vinylchloride-laurylacrylate copolymer: 100 parts by weight
(95:5, degree of polymerization of 430)
Stabilizer (Stan JF-20U manufactured by Sankyo Yuki Co.): 3 parts by weight
Lubricant (Loxiol GE-2 manufactured by Japan Henkel Co.): 2 parts by weight The resulting blend was further melted and kneaded in a hot roll at temperature of 170° C. for 15 minutes, and then the resulting compound was compression molded at 180° C. to produce video disc replicas having an outside diameter of 260 mm and a thickness of about 2 mm. Five pieces of these video disc replicas were inspected on their external appearance. The number of defects having a diameter of 50 microns or more was counted. The results were shown in Table 1 together with the results in the other examples.

EXAMPLE 2

Similar treatments and measurements as in Example 1 were carried out, except the temperature of the pure water was 70° C.

EXAMPLE 3

Similar treatments and measurements as in Example 1 were carried out, except that 200 g of conductive black was dispersed in 2.5 liters of 0.2N hydrochloric acid, the resulting dispersion was stirred for one hour and then suction-filtered followed by washing with 5 liters of pure water (70° C.) and then 1.5 liters of pure water, to which 2 g of conc. ammonia water (28%) was added, and further 3 liters of pure water. The content of Al, Fe, and Ni in addition to Na, K, Ca and V were remarkably reduced.

EXAMPLE 4

Conductive black CSX 150A2 (manufactured by Cabot Co.) having a primary particle size of 20 microns, a specific surface area of 1,350 m$^2$/g, an oil absorption of 320 cm$^3$/100 g, a pH of 8.0 and an ash content of 1.52% was washed and dried in the same manner as in Example 2. The ash content was reduced to 0.30%. Na, K, Ca, Mg, Sr, Cl, P, and Si were in particular remarkably reduced. The resulting conductive black showed a pH of 3.3 after washing and drying. When video disc replicas were produced in the same manner as in Example 1, the color of the surface of the stamper changed. It seems that this change of color is due to the hydrogen chloride generated as a result of the decomposition of vinyl chloride.

EXAMPLE 5

The treatments and measurements were carried out in the same manner as in Example 4 except that the drying process after washing was carried out in a nitrogen gas atmosphere. The change of color was not observed on the surface of the stamper.

EXAMPLE 6

The treatments and measurements were carried out in the same manner as in Example 4 except that the washed conductive black was dispersed in 0.05% aqueous solution of sodium carbonate, suction-filtered, and then dried in air at 120° C. for 15 hours. An increase of ash content owing to sodium carbonate was merely 0.08%. Excellent video discs were obtained.

EXAMPLE 7

Conductive black used in Example 4 was washed in the same manner as in Example 3. Although the ash content was reduced to 0.09%, the pH was reduced to 2.9. When video disc replicas were produced from the resulting conductive black in the same manner as in Example 1, the color of surface of the stamper changed.

EXAMPLE 8

The treatments and measurements were carried out in the same manner as in Example 7 except that the washed conductive black was dispersed in 0.05% aqueous solution of sodium hydroxide, suction-filtered, and then dried in air at 120° C. for 15 hours. An increase of the ash content owing to the sodium hydroxide was merely 0.09%. The change of color was not observed on the surface of the stamper.

COMPARATIVE EXAMPLE 1

The treatments and measurements were carried out in the same manner as in Example 1 except that the conductive black was not washed.

COMPARATIVE EXAMPLE 2

The treatments and measurements were carried out in the same manner as in Example 4 except that the conductive black was not washed.

The ash content and the pH of the conductive blacks obtained in Examples 1 to 8 and Comparative Examples 1, 2 as well as to the number of surface defects of the video disc replicas produced from the above described conductive blacks are listed in Table 1.

It can be seen in the above described Examples and Comparative Examples that according to the present invention video discs showing reduced surface defects can be obtained. In addition, it was made clear that conductive blacks showing a remarkably lower pH changed the color of the surfaces of stampers as shown in Examples 4 and 7.

EXAMPLE 9

The treatments and measurements were carried out in the same manner as in Example 3 except that the conductive black was washed with 0.4N sulfuric acid at room temperature and the washed conductive black was heat treated in nitrogen gas flow as various temperatures of 300° to 1,100° C. for 2 hours followed by cooling to room temperature. In addition to the number of surface defects, an increase of surface defects after leaving the resulting video disc replicas in an atmosphere having a temperature of 40° C. and a relative humidity of 80% for 240 hours was determined. The results are shown in Table 2.

EXAMPLE 10

The conductive black used in Example 4 was heat treated in the same manner as in Example 9. The resulting video disc replicas were tested in respect to the surface defects in the same way. The results are shown in Table 3.

COMPARATIVE EXAMPLES 3, AND 4

Video disc replicas obtained in Comparative Example 1 and 2 were tested by the moisture-proofness test described in Example 9. The results were shown in Talbe 2 and Table 3, respectively.

COMPARATIVE EXAMPLES 5, AND 6

Conductive blacks used in Example 1 and Example 4 were heat treated in a nitrogen gas flow of 600° C. for 2 hours without washing. Video disc replicas produced in the same manner as in Example 9 were tested by the moisture-proofness test. The results are shown in Table 2 and Table 3, respectively.

The comparative Examples shown in Tables 2, and 3 indicate that the video disc replicas produced from conductive black, not subjected to a washing process, shows increased primary surface defects and increased surface defects after the moisture-proofness test, regardless of the heat treatments. In addition, it is found in Examples 9, and 10 that the washed conductive black material, heat treated at temperatures of 400° C. or less, gives video disc replicas produced from said conductive blacks, a particularly large increase in the surface defects after the moisture-proofness test, while heat treatments at temperatures of 900° C. or more lead to an increased number of primary surface defects. It can be derived from the above described results that the optimum heat treatment temperature range is 400° to 900° C.

EXAMPLE 11

Purified conductive black obtained in Example 4 was heat treated in a nitrogen gas flow at various temperatures of 300° to 1,400° C. for 2 hours and then cooled to room temperature. The heat treated conductive black was crushed in a pulverizer (AC Pulversizer manufactured by Hosokawamicron Co.) to crush the pelletized particles of conductive black and then the coarse particles were separated by means of an air flow classifier (Micron-separator manufactured by Hosokawamicron Co.). The obtained purified conductive black has an average secondary particle size of 0.005 mm. Particles having grain sizes of 0.05 mm or more were substantially removed.

Video disc replicas produced from the obtained purified conductive blacks in the same manner as in Example 1 were tested in respect to the surface defects before and after the moisture-proofness test. The results are shown in Table 4.

EXAMPLE 12

The treatments and measurements were carried out in the same manner as in Example 3 except that the conductive black was washed with 0.6N hydrochloric acid at room temperature and the resulting purified conductive black was heat treated at various temperature of 300° to 1,400° C. in nitrogen gas flow for 2 hours followed by cooling to room temperature, the heat treated conductive black being crushed in a Henschel mixer (manufactured by Mitsuimiike Seisakusho Co.) to crush the pelletized particles and then passed through a blowershifter type sieve classifier (manufactured by Taikosha Co.) to collect only particles passing through a screen of 0.044 mm. The resulting video disc replicas were tested in the same manner as in Example 11. The results are shown in Table 5.

COMPARATIVE EXAMPLES 7, AND 8

The treatments and measurements were carried out in the same manner as in Example 11 except that the conductive black was not subjected to a classification process, while the treatment and measurements were carried out in the same manner as in Example 12 except that the conductive black was not subjected to washing process. The results of the tests are shown in Tables 4, and 5. It is clearly found from the comparison of the average numbers of surface defects on the surface of video disc replicas listed on Tables 4, and 5 that the video disc replicas obtained in the Examples are superior to those obtained in the Comparative Examples. This difference in the number of surface defects on the surface of video disc replicas is in particular remarkably shown, when the temperatures of the heat treatment are comparatively higher. On the assumption that the average total number of surface defects on the surface of video disc replicas, after the moisture-proofness test of 3 defects/surface or less is desired, it is found that an optimum heat treatment temperature range can be expanded to 400° to 1,200° C. by the addition of the classification process.

EXAMPLE 13

Video disc replicas were produced from six kinds of conductive blacks as shown in Table 6 in the same manner as in Example 1. However, conductive blacks were used at ratios as shown in Table 6 in order to hold the flow of the blends in the range of 1 to $2\times10^{-2}$ cc/sec and the specific resistivity of the blends in the range of 8 to 25 ohm-cm. It was, however, difficult to obtain blends showing a flow and specific resistivity of the above described range in the case of conductive blacks having an oil absorption of 200 cm$^3$/100 g or less. S/N ratios of video disc replicas as shown in Table 6 are the average values for three pieces of video disc replicas obtained by the same stamper, in which signals of the standard VHS type were put. On the assumption that the playback performance is good when the S/N ratios are 42 dB or more, it can be found that the average primary grain size of conductive blacks of 25 milli-microns or less is desired, preferably 20 milli-microns or less if the fluctuation in the lots and the like are taken into consideration.

TABLE 1

|  | Ash Content (%) | pH | Average number of surface defects (number/side of a disc) |
|---|---|---|---|
| Example 1 | 0.29 | 7.0 | 2.6 |
| Example 2 | 0.19 | 6.6 | 1.7 |
| Example 3 | 0.04 | 6.4 | 0.1 |
| Comparative Example 1 | 0.50 | 9.0 | 11.2 |
| Example 4 | 0.30 | 3.3 | 1.3 |
| Example 5 | 0.30 | 5.8 | 0.7 |
| Example 6 | 0.38 | 6.8 | 1.8 |
| Example 7 | 0.09 | 2.9 | 0.5 |
| Example 8 | 0.18 | 7.2 | 0.4 |
| Comparative Example 2 | 1.52 | 8.0 | 8.7 |

TABLE 2

|  | Conductive carbon blacks | | | | Average number of surface defects on the surface of video disc replica (number/a side of a disc) | |
|---|---|---|---|---|---|---|
|  | Washing | Temperature of heat treatment (°C.) | pH | Ash content (%) | Primary | Number increased after moisture-proofness test |
| Comparative Example 3 | Without | — | 9.0 | 0.50 | 11.2 | 8.2 |
| Comparative Example 5 | " | 600 | 9.3 | 0.52 | 12.5 | 6.9 |
| Example 9 | With | 120 | 6.5 | 0.12 | 0.3 | 5.3 |
| " | " | 300 | 6.8 | 0.12 | 0.4 | 3.1 |
| " | " | 400 | 7.5 | 0.12 | 0.3 | 0.6 |
| " | " | 500 | 8.0 | 0.11 | 0.3 | 0.5 |
| " | " | 600 | 8.7 | 0.10 | 0.4 | 0.2 |
| " | " | 700 | 8.5 | 0.11 | 0.9 | 0.3 |
| " | " | 800 | 8.8 | 0.12 | 1.8 | 0.3 |
| " | " | 900 | 9.0 | 0.11 | 2.3 | 0.4 |
| " | " | 1,000 | 9.0 | 0.12 | 5.0 | 0.4 |
| " | " | 1,100 | 9.8 | 0.13 | 5.4 | 0.2 |

TABLE 3

|  | Conductive carbon blacks | | | | Average number of surface on the surface of video disc replica (number/a side of a disc) | |
|---|---|---|---|---|---|---|
|  | Washing | Temperature heat treatment (°C.) | pH | (%) | Primary | Number increased after moisture-proofness testing |
| Comparative Example 4 | Without | — | 8.4 | 1.52 | 8.7 | 21.1 |
| Comparative Example 6 | " | 600 | 9.2 | 1.48 | 10.5 | 12.0 |
| Example 10 | With | 120 | 3.3 | 0.30 | 1.3 | 7.2 |
| " | " | 300 | 4.2 | 0.28 | 1.0 | 4.1 |
| " | " | 400 | 6.0 | 0.31 | 0.8 | 1.0 |
| " | " | 500 | 7.3 | 0.33 | 0.7 | 0.4 |
| " | " | 600 | 8.8 | 0.29 | 0.8 | 0.2 |
| " | " | 700 | 9.0 | 0.32 | 1.0 | 0.3 |
| " | " | 800 | 9.7 | 0.32 | 2.0 | 0.1 |
| " | " | 900 | 9.8 | 0.33 | 3.3 | 0.2 |
| " | " | 1,000 | 9.5 | 0.35 | 5.3 | 0.4 |
| " | " | 1,100 | 9.5 | 0.34 | 6.1 | 0.7 |

TABLE 49

|  | Conductive carbon blacks | | | | | Average number of surface defects on the surface of video disc replica (number/a side of a disc) | |
|---|---|---|---|---|---|---|---|
|  | Washing | Temperature of heat treatment (°C.) | Classification | pH | Ash Content (%) | Primary | Number increased after moisture-proofness test |
| Comparative Example 7 | Without | — | Without | 8.4 | 1.52 | 8.7 | 21.1 |
| Comparative Example 7 | With | 120 | " | 3.3 | 0.30 | 1.3 | 7.2 |
| Comparative | " | 300 | " | 4.2 | 0.28 | 1.0 | 4.1 |

TABLE 49-continued

| | Conductive carbon blacks | | | | | Average number of surface defects on the surface of video disc replica (number/a side of a disc) | |
|---|---|---|---|---|---|---|---|
| | Washing | Temperature of heat treatment (°C.) | Classification | pH | Ash Content (%) | Primary | Number increased after moisture-proofness test |
| Example 7 Comparative Example 7 | " | 400 | " | 6.0 | 0.31 | 0.8 | 1.0 |
| Comparative Example 7 | " | 600 | " | 8.8 | 0.29 | 0.8 | 0.2 |
| Comparative Example 7 | " | 800 | " | 9.7 | 0.32 | 2.0 | 0.1 |
| Comparative Example 7 | " | 1,000 | " | 9.5 | 0.35 | 5.3 | 0.4 |
| Comparative Example 7 | " | 1,200 | " | 9.6 | 0.31 | 6.8 | 0.7 |
| Comparative Example 7 | Without | — | With | 8.6 | 1.46 | 5.4 | 17.8 |
| Example 11 | With | 120 | " | 3.2 | 0.28 | 1.1 | 6.8 |
| " | " | 300 | " | 4.5 | 0.28 | 0.6 | 3.7 |
| " | " | 400 | " | 6.2 | 0.29 | 0.5 | 0.9 |
| " | " | 600 | " | 8.5 | 0.27 | 0.5 | 0.2 |
| " | " | 800 | " | 9.0 | 0.28 | 0.8 | 0.1 |
| " | " | 1,000 | " | 9.5 | 0.30 | 1.1 | 0.3 |
| " | " | 1.200 | " | 9.4 | 0.30 | 1.8 | 0.4 |
| " | " | 1,400 | " | 9.7 | 0.27 | 4.2 | 0.9 |

TABLE 5

| | Conductive carbon blacks | | | | | Average number of surface defects on the surface of video disc replica (number/a side of a disc) | |
|---|---|---|---|---|---|---|---|
| | Washing | Temperature of heat treatment (°C.) | Classification | pH | Ash Content (%) | Primary | Number increased after moisture-proofness test |
| Comparative Example 8 | Without | — | Without | 9.0 | 0.50 | 11.2 | 8.2 |
| Comparative Example 8 | With | 120 | " | 6.5 | 0.12 | 0.3 | 5.3 |
| Comparative Example 8 | " | 300 | " | 6.8 | 0.12 | 0.4 | 3.1 |
| Comparative Example 8 | " | 400 | " | 7.5 | 0.12 | 0.3 | 0.6 |
| Comparative Example 8 | " | 600 | " | 8.7 | 0.10 | 0.4 | 0.2 |
| Comparative Example 8 | " | 800 | " | 8.8 | 0.12 | 0.8 | 0.3 |
| Comparative Example 8 | " | 1,000 | " | 9.0 | 0.12 | 5.0 | 0.4 |
| Comparative Example 8 | " | 1,200 | " | 9.4 | 0.11 | 7.3 | 0.7 |
| Comparative Example 8 | Without | — | With | 8.7 | 0.42 | 10.0 | 8.0 |
| Example 12 | With | 120 | " | 6.5 | 0.11 | 0.3 | 4.5 |
| " | " | 300 | " | 6.7 | 0.12 | 0.3 | 2.3 |
| " | " | 400 | " | 7/7 | 0.10 | 0.2 | 0.4 |
| " | " | 600 | " | 8.9 | 0.10 | 0.3 | 0.2 |
| " | " | 800 | " | 8.8 | 0.10 | 0.6 | 0.3 |
| " | " | 1,000 | " | 9.2 | 0.12 | 0.9 | 0.2 |
| " | " | 1,200 | " | 9.5 | 0.11 | 1.3 | 0.4 |
| " | " | 1,400 | " | 9.6 | 0.11 | 3.8 | 0.6 |

TABLE 6

| | Conductive carbon blacks | | | Blends | | | |
|---|---|---|---|---|---|---|---|
| Brand (Manufacturer) | Grain size (millimicron) | Surface area (m²/g) | Oil absorption (cm³/100 g) | blending ratio (PHR) | Flow ($10^{-2}$ cc/sec) | Specific resistivity (ohm-cm) | Video Disc S/N ratio (dB) |
| CSX 174 (Cabot Co.) | 16 | 1780 | 420 | 22 | 1.2 | 9 | 43 |
| CC40-220 (Columbian Chemicals Co.) | 18 | 1080 | 230 | 28 | 1.7 | 17 | 44 |
| CSX 150A2 (Cabot Co.) | 20 | 1350 | 320 | 23 | 1.5 | 15 | 43 |
| CSX 147 (Cabot Co.) | 25 | 770 | 200 | 32 | 1.4 | 22 | 42 |
| Ketjen EC (Nippon EC Co.) | 30 | 950 | 350 | 20 | 2.0 | 11 | 40 |
| Conductex 975 | 46 | 270 | 160 | 45 | 1.0 | 32 | 30 |

TABLE 6-continued

| Brand (Manufacturer) | Conductive carbon blacks | | | | Blends | | |
|---|---|---|---|---|---|---|---|
| | Grain size (milli-micron) | Surface area ($m^2/g$) | Oil absorption ($cm^3/100\ g$) | blending ratio (PHR) | Flow ($10^{-2}$ cc/sec) | Specific resistivity (ohm-cm) | Video Disc S/N ratio (dB) |
| (Columbian Chemicals Co.) | | | | | | | |

What is claimed is:

1. A method of producing video discs having reduced surface defects and improved moisture-proofness by molding a conductive material comprising a blend of thermoplastic resins and conductive carbon blacks and forming information signals on said video discs in the form of a change in the geometric variation, wherein said conductive blacks have an average primary particle size of 25 millimicrons or less measured by an electron microscope and an oil absorption of 200 $cm^3/100$ g or more measured by ASTM D 2414-79, and wherein said conductive carbon blacks are preliminarily washed with water or an aqueous solution of an inorganic acid to remove ash before blending and molding the conductive material.

2. A method of producing video discs as claimed in claim 1, wherein said inorganic acids contain at least one acid selected from the group consisting of sulfuric acid and hydrochloric acid.

3. A method of producing video discs as claimed in claim 1, wherein said conductive carbon blacks, from which ash was removed, are dried by heating in vacuum or an inert gas atmosphere.

4. A method of producing video discs as claimed in claim 1, wherein said conductive carbon blacks, from which ash was removed, are impregnated with an alkaline aqueous solution selected from the group consisting of ammonia, alkali metal hydroxides and alkali metal salts solutions, and then dried.

5. A method of producing video discs as claimed in claim 1, wherein the ash removed blacks are heated in a nonoxidizing atmosphere at temperature of 400° to 900° C.

6. A method of producing video discs as claimed in claim 1, wherein the ash removed carbon blacks are heated in a nonoxidizing atmosphere at a temperature of 400° to 1,200° C. and the coarse particles having grain size of 0.05 mm or more are removed substantially by a dry classification.

7. A method according to claim 1 wherein the conductive material comprises 10 to 40 parts by weight of the preliminarily washed carbon blacks blended with 100 parts by weight of the thermoplastic resin.

8. A method according to claim 7 wherein the thermoplastic resin is a vinyl chloride type thermoplastic resin.

9. A method according to claim 7 wherein the conductive material also contains an effective amount of plasticizers, stabilizers and lubricants.

10. A method according to claim 1 wherein the conductive carbon blacks have an average primary particle size of 20 millimicrons or less.

* * * * *